US010741832B2

(12) United States Patent
Sun et al.

(10) Patent No.: US 10,741,832 B2
(45) Date of Patent: Aug. 11, 2020

(54) POSITIVE ELECTRODE ACTIVE MATERIAL FOR LITHIUM ION BATTERY (71) Applicant: SEKISUI CHEMICAL CO., LTD., Osaka (JP)

(72) Inventors: Ren-de Sun, Osaka (JP); Shoji Nozato, Osaka (JP); Akira Nakasuga, Osaka (JP); Masanori Nakamura, Kyoto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 138 days.

(21) Appl. No.: 15/469,843

(22) Filed: Mar. 27, 2017

(65) Prior Publication Data
US 2017/0200945 A1 Jul. 13, 2017

Related U.S. Application Data (63) Continuation of application No. PCT/JP2015/077330, filed on Sep. 28, 2015.

(30) Foreign Application Priority Data

Sep. 29, 2014 (JP) ................................. 2014-199390

(51) Int. Cl.
*H01M 4/583* (2010.01)
*H01M 4/36* (2006.01)
(Continued)

(52) U.S. Cl.
CPC .......... *H01M 4/366* (2013.01); *H01M 4/131* (2013.01); *H01M 4/36* (2013.01); *H01M 4/505* (2013.01);
(Continued)

(58) Field of Classification Search
CPC ....... H01M 4/366; H01M 4/131; H01M 4/583
See application file for complete search history.

(56) References Cited

U.S. PATENT DOCUMENTS

| 2010/0112449 A1 | 5/2010 | Fujita et al. |
| 2011/0177391 A1 | 7/2011 | Ookita et al. |

(Continued)

FOREIGN PATENT DOCUMENTS

| CN | 101835830 A | 9/2010 |
| CN | 101855072 A | 10/2010 |

(Continued)

OTHER PUBLICATIONS

Extended European Search Report issued in European Application No. 15847380.1; dated Jan. 29, 2018 (7 pages).

(Continued)

*Primary Examiner* — James Lee
(74) *Attorney, Agent, or Firm* — Osha Liang LLP (57) ABSTRACT

A positive electrode active material for a lithium ion battery includes a coating layer comprising amorphous carbon on a surface of a positive electrode active material, wherein the amorphous carbon is derived from carbon contained in an oxazine resin, a ratio of a peak intensity of a G band to a peak intensity of a D band is 1.0 or greater when the amorphous carbon is measured by Raman spectroscopy, an average film thickness of the coating layer is 100 nm or less, and a coefficient of variation (CV value) of a film thickness of the coating layer is 10% or less.

6 Claims, 1 Drawing Sheet

(51) Int. Cl.
- *H01M 4/505* (2010.01)
- *H01M 4/525* (2010.01)
- *H01M 4/58* (2010.01)
- *H01M 4/131* (2010.01)
- *H01M 10/0525* (2010.01)
- *H01M 4/02* (2006.01)

(52) U.S. Cl.
CPC ............. *H01M 4/525* (2013.01); *H01M 4/58* (2013.01); *H01M 4/583* (2013.01); *H01M 10/0525* (2013.01); *H01M 2004/021* (2013.01)

(56) References Cited

U.S. PATENT DOCUMENTS

| | | | |
|---|---|---|---|
| 2012/0129052 A1* | 5/2012 | Bauer | H01M 4/366 429/231.1 |
| 2012/0178013 A1 | 7/2012 | Lee et al. | |
| 2013/0244112 A1 | 9/2013 | Oh et al. | |
| 2014/0194018 A1 | 7/2014 | Nakamura | |
| 2014/0287310 A1* | 9/2014 | Oono | H01M 4/625 429/221 |

FOREIGN PATENT DOCUMENTS

| | | |
|---|---|---|
| JP | H11-97011 A | 4/1999 |
| JP | 2013-095613 A | 5/2013 |
| JP | 2014-150013 A | 8/2014 |
| KR | 20060093842 A | 8/2006 |
| WO | 2008/120442 A1 | 10/2008 |
| WO | 2009032212 A1 | 3/2009 |
| WO | 2009035909 A1 | 3/2009 |
| WO | 2010/035681 A1 | 4/2010 |
| WO | 2013/027674 A1 | 2/2013 |

OTHER PUBLICATIONS

Jaephil Cho et al: "Zero-Strain Intercalation Cathode for Rechargeable Li-Ion Cell", Angew. Chem. Int. Ed., vol. 113, Issue 18, Sep. 17, 2001, pp. 3471-3473 (3 pages).

I. Belharouak et al: "Synthesis and electrochemical analysis of vapor-deposited carbon-coated LiFePO4", Electrochemistry Communications 7 (2005), pp. 983-988 (6 pages).

International Search Report issued in International Application No. PCT/JP2015/077330; dated Dec. 28, 2015 with English Translation (4 pages).

Office Action issued in European Application No. 15847380.1, dated Aug. 24, 2018 (6 pages).

Office Action issued in Taiwanese Application No. 105102652; dated Mar. 26, 2019 (6 pages).

Office Action issued in European Application No. 15847380.1; dated Apr. 15, 2019 (5 pages).

Office Action issued in corresponding Chinese Application No. 201580028968.8; dated Sep. 2, 2019 (12 pages).

* cited by examiner

POSITIVE ELECTRODE ACTIVE MATERIAL FOR LITHIUM ION BATTERY

TECHNICAL FIELD

One or more embodiments of the present invention relate to a positive electrode active material for a lithium ion battery that can suppress elution of metal ions or a change in a crystal structure at the time of charging and discharging, hardly deteriorates over time at the time of use, and can achieve high stability at the time of charging and discharging.

BACKGROUND

Among secondary batteries that have been put to practical use so far, a lithium ion battery has the highest energy density and generates a high voltage. Therefore, a lithium ion battery is frequently used as a battery for laptop computers, mobile phones, and the like. Usually, the lithium ion battery is constituted with a positive electrode, an electrolyte, a negative electrode, and a separator installed between the positive electrode and the negative electrode. As the positive electrode, a material obtained by fixing an electrode mixture, which is composed of a lithium ion-containing positive electrode active material, a conduction aid, an organic binder, and the like, onto the surface of a metal foil (current collector) is used. As the negative electrode, a material obtained by fixing an electrode mixture, which is composed of a negative electrode active material that enables lithium ions to be removed therefrom or inserted thereinto, a conduction aid, an organic binder, and the like, onto the surface of a metal foil is used.

As the positive electrode active material used in the lithium ion battery, lithium-transition metal composite oxides based on lithium cobalt oxide ($LiCoO_2$), lithium nickelate ($LiNiO_2$), lithium manganate ($LiMn_2O_4$), lithium iron phosphate ($LiFePO_4$), and the like have been put to practical use.

In a case where these lithium-transition metal composite oxides are used, due to the repetition of charging and discharging, battery performance such as capacity or cycle characteristics may deteriorate. For example, although a theoretical capacity of $LiCoO_2$ is 274 mAh/g, a battery is generally used at a voltage of about 4.2 V and a capacity of about 150 mAh/g, and accordingly, the capacity thereof utilized is only about half of the theoretical capacity. In order to obtain a higher capacity, charging and discharging need to be performed at a higher voltage, and in this case, phase transition of $LiCoO_2$ and performance deterioration resulting from elution of cobalt markedly occur. Furthermore, there is a concern that the electrolytic solution may be oxidized and decomposed due to an increase of oxidation voltage.

$LiNiO_2$ has a layered crystal structure just like $LiCoO_2$, is cheap, and has a reversible capacity greater than that of $LiCoO_2$. However, $LiNiO_2$ undergoes a significant decrease of capacity due to a change in the crystal structure resulting from charging and discharging similarly to $LiCoO_2$. A $LiMn_2O_4$-based active material is expected to be usable in a large-sized battery for automobiles and the like, because a source of this material is abundant, and the safety thereof is relatively high. However, Mn is more easily eluted than Co and Ni, and a capacity of $LiMn_2O_4$ markedly decreases due to charging and discharging.

In addition to the change in a crystal structure or the elution of ions described above, decomposition of the electrolyte, alteration of the surface of the active material, and the like are considered causes of decrease of the battery capacity.

As a method for ameliorating the decrease of a charging/discharging capacity of positive electrode active materials, a method of coating surfaces of the active materials with different materials is suggested. For example, NPL 1 reports that a method of coating the surface of $LiCoO_2$ with an oxide ($ZrO_2$, $Al_2O_3$, $TiO_2$, or the like) is effective for suppressing a change in a crystal structure at the time of charging and discharging or elution of $Co^{++}$ ions.

Furthermore, because a positive electrode active material such as $LiMn_2O_4$ or $LiFePO_4$ has high electrical resistance, the improvement of their performance by reducing resistance is a great challenge. As a method for address such a challenge, carbon coating is reported as an effective method. For example, NPL 2 reports that, by coating the surface of an iron phosphate-based active material with carbon, the conductivity of lithium iron phosphate is improved, and hence a battery capacity is improved.

In addition, PTL 1 discloses a method of improving a battery capacity of $LiVP_2O_7$ by carbon coating.

However, in a case of the oxide coating disclosed in NPL 1, because the transfer efficiency of electrons or lithium ions in the oxide is poor, the battery performance greatly depends on a thickness or film quality of the coating layer, and hence it is not easy to optimize the battery performance.

Furthermore, in a case of the carbon coating disclosed in NPL 2 or PTL 1, in order to form a carbon film, a high-temperature treatment process is required in general, and hence grain growth may be insufficient or costs of the active material tend to be high. In addition, by the coating method (PTL 1), in which a mixture of an active material and a carbon raw material is fired at a high temperature, a dense coating layer is not be easily obtained.

CITATION LIST

Patent Literature

[PTL 1] JP-A-2013-95613

Non Patent Literature

[NPL 1] J. Cho, Y. J. Kim, T. J. Kim, B. Park, Angew. Chem. Int. Ed. 40, 3367(2001)

[NPL 2] I.Belharouak, C.Johnson, K.Amine, Synthesis and electrochemical analysis of vapor-deposited carbon-coated LiFePO4, Electrochemistry Communications, Volume 7, Issue 10, October 2005, Pages 983-988

SUMMARY

One or more embodiments of the present invention have been made based on the current circumstances described above, and provide a positive electrode active material for a lithium ion battery that can suppress elution of metal ions and a change in a crystal structure at the time of charging and discharging, hardly deteriorates over time at the time of use, and can achieve high stability at the time of charging and discharging.

One or more embodiments of the present invention relate to a positive electrode active material for a lithium ion battery that has a coating layer composed of amorphous carbon on the surface of a positive electrode active material. In the positive electrode active material for a lithium ion battery, the amorphous carbon is derived from carbon contained in an oxazine resin; in a case where the amorphous carbon is analyzed by Raman spectroscopy, a ratio of a peak intensity of a G band to a peak intensity of a D band is 1.0 or greater; an average film thickness of the coating layer is 100 nm or less; and a coefficient of variation (CV value) of a film thickness of the coating layer is 10% or less.

Hereinafter, one or more embodiments of the present invention will be specifically described.

As a result of conducting intensive examination, the inventors obtained knowledge that, by forming a coating layer, which is composed of carbon derived from a predetermined resin and has predetermined physical properties, on the surface of a positive electrode active material, it is possible to obtain a positive electrode active material for a lithium ion battery that can suppress elution of metal ions and a change in a crystal structure at the time of charging and discharging, hardly deteriorates over time at the time of use, and can achieve high stability at the time of charging and discharging.

The positive electrode active material for a lithium ion battery according to one or more embodiments of the present invention has a coating layer composed of amorphous carbon on the surface of a positive electrode active material.

The positive electrode active material may be an oxide of a transition metal containing lithium.

Examples of the oxide of a transition metal containing lithium include at least one kind of compound selected from the group consisting of lithium cobalt oxide ($LiCoO_2$), lithium nickelate ($LiNiO_2$), lithium manganate ($LiMn_2O_4$), lithium manganese cobaltate ($LiMnCoO_4$), lithium cobalt phosphate ($LiCoPO_4$), lithium manganese chromate ($LiMnCrO_4$), lithium nickel vanadate ($LiNiVO_4$), nickel-substituted lithium manganate (for example, $LiMn_{1.5}Ni_{0.5}O_4$), lithium cobalt vanadate ($LiCoVO_4$), and lithium iron phosphate ($LiFePO_4$), at least one kind of compound selected from the group consisting of nonstoichiometric compounds obtained by substituting a portion of the above compositions with a metal element, compounds including both of the above, and the like. Examples of the aforementioned metal element include at least one kind of metal element selected from the group consisting of Mn, Mg, Ni, Co, Cu, Zn, and Ge.

In one or more embodiments of the present invention, at least one kind of compound selected from the group consisting of lithium cobalt oxide, lithium nickelate, lithium manganate, and lithium iron phosphate may be used.

The aforementioned positive electrode active material may have, for example, a particle shape, a flake shape, a fiber shape, a tube shape, a plate shape, a porous shape, and the like. The positive electrode active material may have a particle shape or a flake shape.

In a case where the positive electrode active material has a particle shape, an average particle size thereof may be 0.02 to 40 μm.

The positive electrode active material for a lithium ion battery according to one or more embodiments of the present invention has a coating layer composed of amorphous carbon. Because of having the coating layer, the positive electrode active material for a lithium ion battery can greatly ameliorate the elution of metal ions, the change in a crystal structure, and the deterioration over time at the time of use while maintaining high stability at the time of charging and discharging.

The coating layer can be prepared through a simple process without requiring a high-temperature firing process.

The coating layer may be formed on at least a portion of the surface of the positive electrode active material, or may be formed such that the entire surface of the positive electrode active material is coated. The coating layer may be formed such that the entire surface of the positive electrode active material is coated, because then oxidation resistance and corrosion resistance of the positive electrode active material can be further improved.

The coating layer may be a highly dense layer. In one or more embodiments of the present invention, because a highly dense coating layer is formed, the contact between the positive electrode active material and the external environment can be prevented, and hence the elution of metal ions or the change in a crystal structure at the time of charging and discharging can be suppressed.

There is no strict definition of "denseness" of the dense coating layer. In one or more embodiments of the present invention, when each of nanoparticles is observed using a high-resolution transmission electron microscope, in a case where a coating layer on the particle surface is clearly observed as in FIG. 1, and the coating layer is found to be continuously formed, the coating layer is defined as being "dense".

In one or more embodiments, the amorphous carbon constituting the coating layer has an amorphous structure in which an sp2 bond is mixed with an sp3 bond, and is composed of carbon. In a case where the amorphous carbon is analyzed by Raman spectroscopy, a ratio of a peak intensity of a G band to a peak intensity of a D band is 1.0 or greater.

In a case where the amorphous carbon is analyzed by Raman spectroscopy, two peaks of a G band (at around 1,580 $cm^{-1}$) corresponding to the sp2 bond and a D band (at around 1,360 $cm^{-1}$) corresponding to the sp3 bond are clearly observed. In a case where a carbon material has crystallinity, any one of the above two bands is continuously minimized. For example, in a case of single-crystal diamond, a G band at around 1,580 $cm^{-1}$ is practically not observed. In contrast, in a case of a high-purity graphite structure, a D band at around 1,360 $cm^{-1}$ practically does not appear.

In one or more embodiments of the present invention, particularly, in a case where the ratio of a peak intensity of the G band to a peak intensity of the D band (peak intensity of G band/peak intensity of D band) is 1.5 or greater, denseness of the formed amorphous carbon film is improved, and an effect of inhibiting sintering that occurs between particles at a high temperature becomes excellent.

In a case where the ratio of a peak intensity is less than 1.0, the denseness of the film and an effect of suppressing sintering at a high temperature become insufficient, and adhesiveness and strength of the film deteriorate.

The ratio of a peak intensity may be 1.2 to 10.

The aforementioned coating layer may contain an element other than carbon. Examples of the element other than carbon include nitrogen, hydrogen, oxygen, and the like. A content of the element may be 10 at % or less with respect to a total content of carbon and the element other than carbon.

The amorphous carbon constituting the coating layer is derived from carbon contained in an oxazine resin, and the oxazine resin can be carbonized at a low temperature. Therefore, cost reduction can be accomplished.

The oxazine resin is a resin that is generally classified into a phenol resin. The oxazine resin is a thermosetting resin obtained by adding amines to phenols and formaldehyde and causing a reaction. In a case where a type of phenol which may additionally have an amino group on a phenol ring, for example, a phenol such as para-aminophenol is used as the phenols, amines do not need to be added in the aforementioned reaction, and the resin tends to be easily carbonized. Regarding the ease of carbonization, the resin is more easily carbonized by the use of a naphthalene ring than by the use of a benzene ring.

The aforementioned oxazine resin includes a benzoxazine resin and a naphthoxazine resin. Between these, a naphthoxazine resin is suitable because this resin is easily carbonized at the lowest temperature. As a partial structure of the oxazine resin, a partial structure of a benzoxazine resin is shown in the following Formula (1), and a partial structure of a naphthoxazine resin is shown in the following Formula (2).

As shown in the following formulae, the oxazine resin refers to a resin having a 6-membered ring added to a benzene ring or a naphthalene ring. The 6-membered ring contains oxygen and nitrogen, and the name of the resin is derived from such a structure.

In a case where the oxazine resin is used, it is possible to obtain an amorphous carbon film at a temperature that is much lower than a temperature at which the amorphous carbon film is obtained using other resins such as an epoxy resin. Specifically, the oxazine resin can be carbonized at a temperature of 200° C. or lower. Particularly, in a case where a naphthoxazine resin is used, the resin can be carbonized at a lower temperature.

In this way, by carbonizing an oxazine resin at a lower temperature, a highly dense coating layer having amorphous carbon can be formed.

It is unclear why the highly dense coating layer having amorphous carbon is formed. Presumably, for example, in a case where a naphthoxazine resin is used as an oxazine resin, naphthalene structures in the resin may be locally linked to each other due to heating at a low temperature, a layered structure may be formed at a molecular level, and hence the aforementioned highly dense coating film may be formed. The layered structure is not treated at a high temperature and hence does not develop into a long-range periodic structure such as graphite. Therefore, the layered structure does not exhibit crystallinity.

Whether the obtained carbon has a graphite-like structure or an amorphous structure can be confirmed by checking whether or not a peak is detected at a position in which $2\theta$ equals 26.4° by an X-ray diffractometry which will be described later.

In one or more embodiments, as raw materials of the aforementioned naphthoxazine resin, dihydroxynaphthalene which is one of the phenols, formaldehyde, and amines are used. These will be specifically described later.

The aforementioned amorphous carbon may be obtained by performing a thermal treatment on the aforementioned oxazine resin at a temperature of 150° C. to 350° C. In one or more embodiments of the present invention, a naphthoxazine resin which can be carbonized at a low temperature is used, and accordingly, amorphous carbon can be obtained at a relatively low temperature.

Obtaining the amorphous carbon at a low temperature as described above brings an advantage that the amorphous carbon can be prepared by at lower costs through a simpler process as compared with the related art.

A temperature of the thermal treatment may be 170° C. to 300° C.

In one or more embodiments, an upper limit of an average film thickness of the aforementioned coating layer is 100 nm. In a case where the average film thickness of the coating layer is greater than 100 nm, the size of particles increases after coating, and charging/discharging characteristics of a positive electrode active material for a lithium ion battery prepared using the particles become poor in some cases. The upper limit of the average film thickness of the coating layer may be 80 nm. A lower limit of the average film thickness of the coating layer is not particularly limited, and may be 1 nm.

In one or more embodiments, a coefficient of variation (CV value) of a film thickness of the coating layer is 10% or less. In a case where the CV value of the film thickness of the coating layer is 10% or less, the film thickness of the coating layer becomes uniform and hardly shows a variation. Therefore, desired functions (ion elution and crystallinity maintainability) can be imparted even with a thin film. An upper limit of the CV value of the film thickness of the coating layer may be 8.0%. A lower limit of the CV value is not particularly limited, and may be 0.5%.

The CV value (%) of a film thickness is obtained by expressing a value, which is obtained by dividing a standard deviation by an average film thickness, as a percentage. The CV value is a numerical value determined by the following equation. The smaller the CV value, the smaller the variation of the film thickness.

CV value of film thickness (%)=(standard deviation of film thickness/average film thickness)×100

The average film thickness and the standard deviation can be measured using, for example, FE-TEM.

The aforementioned coating layer may exhibit excellent adhesiveness with respect to the positive electrode active material. Although there is no clear definition of adhesiveness, the coating layer may not be peeled off even if a mixture containing the positive electrode active material for a lithium ion battery, a resin, a plasticizer, and a dispersant is treated with a bead mill.

In one or more embodiments of the present invention, in a case where the coating layer is measured by time-of-flight secondary ion mass spectrometry (TOF-SIMS), at least either a mass spectrum resulting from a benzene ring or a mass spectrum resulting from a naphthalene ring may be detected.

In a case where a mass spectrum resulting from a benzene ring or a naphthalene ring is detected as described above, the coating layer can be confirmed to be derived from carbon contained in an oxazine resin.

In one or more embodiments of the present invention, the mass spectrum resulting from a benzene ring refers to a mass spectrum at around 77.12, and the mass spectrum resulting from a naphthalene ring refers to a mass spectrum at around 127.27.

The coating layer can be measured as above by using, for example, a TOF-SIMS device (manufactured by ION-TOF GmbH).

In one or more embodiments of the present invention, in a case where the coating layer is measured by X-ray diffractometry, a peak may not be detected at a position in which 2θ equals 26.4°.

The peak in a position in which 2θ is 26.4° is a peak of a graphite crystal. In a case where a peak is not detected at such a position, it can be mentioned that carbon forming the coating layer has an amorphous structure.

The coating layer can be measured as above by using, for example, an X-ray diffractometer (SmartLab Multipurpose, manufactured by Rigaku Corporation) or the like.

As a method for manufacturing the positive electrode active material for a lithium ion battery according to one or more embodiments of the present invention, it is possible to use a method including a step of preparing a mixed solution containing formaldehyde, aliphatic amine, and dihydroxynaphthalene, a step of adding a positive electrode active material to the mixed solution and causing a reaction, and a step of performing a thermal treatment at a temperature of 150° C. to 350° C.

In the method for manufacturing the positive electrode active material for a lithium ion battery according to one or more embodiments of the present invention, a step of preparing a mixed solution containing formaldehyde, aliphatic amine, and dihydroxynaphthalene is performed.

Because formaldehyde is unstable, formalin, which is a formaldehyde solution, may be used. Generally, formalin contains formaldehyde, water, and a small amount of methanol as a stabilizer. The formaldehyde used in one or more embodiments of the present invention may be formalin as long as the formalin contains a specific amount of formaldehyde.

Formaldehyde also includes paraformaldehyde as a type of polymer thereof. Although paraformaldehyde can be used as a raw material, formalin described above may be used because reactivity of paraformaldehyde is poor.

The aforementioned aliphatic amine is represented by a formula $R-NH_2$, and R may be an alkyl group having 5 or less carbon atoms. Examples of the alkyl group having 5 or less carbon atoms include, but are not limited to, a methyl group, an ethyl group, a n-propyl group, an isopropyl group, a cyclopropyl group, a n-butyl group, an isobutyl group, a s-butyl group, a t-butyl group, a cyclobutyl group, a cyclopropylmethyl group, a n-pentyl group, a cyclopentyl group, a cyclopropylethyl group, and a cyclobutylmethyl group.

A molecular weight of the aliphatic amine may be reduced. Therefore, the substituent R may be a methyl group, an ethyl group, a propyl group, or the like. Aliphatic amine called methylamine, ethylamine, propylamine, and the like in actual compound names can be used. Among these, methylamine having the smallest molecular weight may be used in one or more embodiments of the present invention.

The aforementioned dihydroxynaphthalene includes many isomers, and examples thereof include 1,3-dihydroxynaphthalene, 1,5-dihydroxynaphthalene, 1,6-dihydroxynaphthalene, 1,7-dihydroxynaphthalene, 2,3-dihydroxynaphthalene, 2,6-dihydroxynaphthalene, and 2,7-dihydroxynaphthalene.

Among these, in view of high reactivity, 1,5-dihydroxynaphthalene and 2,6-dihydroxynaphthalene may be used in one or more embodiments of the present invention. In one or more embodiments, 1,5-dihydroxynaphthalene may be used because it is the most reactive.

Regarding a proportion of each of three components of dihydroxynaphthalene, aliphatic amine, and formaldehyde, in the aforementioned mixed solution, 1 mole of dihydroxynaphthalene, 1 mole of aliphatic amine, and 2 moles of formaldehyde may be formulated together.

Depending on the reaction conditions, the raw materials are lost during the reaction due to volatilization or the like, and accordingly, an optimal formulation ratio is not limited only to the above ratio. However, the raw materials may be formulated together at a formulation ratio of dihydroxynaphthalene:aliphatic amine:formaldehyde=1:0.8 to 1.2:1.6 to 2.4 in terms of mole.

In a case where the amount of the aliphatic amine is set to be 0.8 moles or greater, an oxazine ring can be sufficiently formed, and polymerization can suitably proceeds. In a case where the amount of the aliphatic amine is set to be 1.2 moles or less, formaldehyde necessary for the reaction is not excessively consumed. Therefore, the reaction smoothly proceeds, and naphthoxazine can be obtained as desired. Likewise, in a case where the amount of formaldehyde is set to be 1.6 moles or greater, an oxazine ring can be sufficiently formed, and polymerization can suitably proceeds.

Furthermore, the amount of formaldehyde may be set to be 2.4 moles or less, because then the occurrence of a side reaction can be reduced.

The aforementioned mixed solution may contain a solvent which is for dissolving and reacting the aforementioned 3 raw materials.

Examples of the solvent include solvents generally used for dissolving a resin, such as alcohols including methanol, ethanol, and isopropanol, tetrahydrofuran, dioxane, dimethylformamide, dimethylacetamide, dimethyl sulfoxide, and N-methylpyrrolidone.

An amount of the solvent added to the mixed solution is not particularly limited. In a case where the amount of the raw materials including dihydroxynaphthalene, aliphatic amine, and formaldehyde is regarded as being 100 parts by mass, the amount of the solvent formulated with the mixed solution may be 300 to 20,000 parts by mass in general. In a case where the amount of the solvent is set to be 300 parts by mass or greater, solutes can be thoroughly dissolved, and hence a uniform film can be formed. In a case where the amount of the solvent is set to be 20,000 parts by mass or less, a concentration necessary for forming the coating layer can be secured.

In the method for manufacturing the positive electrode active material for a lithium ion battery according to one or more embodiments of the present invention, a step of adding a positive electrode active material to the aforementioned mixed solution and causing a reaction is performed. By causing the reaction to proceed, a layer composed of a naphthoxazine resin can be formed on the surface of the positive electrode active material.

The aforementioned reaction can proceed at room temperature. However, heating to a temperature of 40° C. or higher may be performed, because then the reaction time can be shortened. In a case where heating is continued, the prepared oxazine ring is opened, and polymerization occurs. As a result, the molecular weight increases, and hence a so-called polynaphthoxazine resin is formed. In a case where the reaction proceeds excessively, viscosity of the solution may increase and become inappropriate for coating. Accordingly, care may be required.

Furthermore, for example, it is possible to use a method of adding a positive electrode active material after the mixed solution of formaldehyde, aliphatic amine, and dihydroxynaphthalene is reacted for a certain period of time.

In order to make particles uniformly coated, the particles may be in a dispersed state at the time of coating reaction. As a dispersing method, a known method such as stirring, ultrasound, and rotation can be used. Furthermore, in order to improve the dispersed state, an appropriate dispersant may be added.

In addition, after the reaction step is performed, the solvent may be dried and removed by hot air or the like such that the surface of the positive electrode active material is uniformly coated with the resin. The heating and drying method is not particularly limited as well.

Then, in the method for manufacturing the positive electrode active material for a lithium ion battery according to one or more embodiments of the present invention, a step of performing a thermal treatment at a temperature of 150° C. to 350° C. is performed.

Through this step, the resin used for coating in the preceding step is carbonized, and hence a coating layer composed of amorphous carbon can be obtained.

A method of the aforementioned thermal treatment is not particularly limited, and examples thereof include methods using a heating oven, an electric furnace, or the like.

A temperature during the thermal treatment is 150° C. to 350° C. In one or more embodiments of the present invention, a naphthoxazine resin that can be carbonized at a low temperature is used, and accordingly, amorphous carbon can be obtained at a lower temperature. In this case, an upper limit of the heating temperature may be 250° C.

The heating treatment may be performed in the air or in an inert gas such as nitrogen or argon. In a case where the temperature of the thermal treatment is 250° C. or higher, an inert gas atmosphere may be used.

The positive electrode active material for a lithium ion battery according to one or more embodiments of the present invention is useful for being used in lithium ion batteries for industrial use, consumer use, automobiles, and the like.

According to one or more embodiments of the present invention, it is possible to provide a positive electrode active material for a lithium ion battery that can suppress elution of metal ions or a change in a crystal structure at the time of charging and discharging, hardly deteriorates over time at the time of use, and can achieve high stability at the time of charging and discharging.

DESCRIPTION OF EMBODIMENTS

Hereinafter, one or more embodiments of the present invention will be more specifically described based on examples, but the present invention is not limited to the examples.

EXAMPLE 1

(Formation of coating layer)

0.1 g of 1,5-dihydroxynaphthalene (manufactured by TOKYO CHEMICAL INDUSTRY CO., LTD.), 0.05 g of 40% methylamine (manufactured by Wako Pure Chemical Industries, Ltd.), and 0.1 g of a 37% aqueous formaldehyde solution (manufactured by Wako Pure Chemical Industries, Ltd.) were sequentially dissolved in ethanol, thereby preparing 20 g of a mixed ethanol solution.

Then, 0.5 g of positive electrode active material particles (lithium cobalt oxide "$LiCoO_2$", average particle size: 2 μm) were added to the obtained mixed solution, and the solution was treated for 4 hours in an ultrasonic tank. The solution was filtered, washed 3 times with ethanol, and then dried for 3 hours at 50° C. in a vacuum. The particles dried as above were heated for 2 hours at 150° C., thereby obtaining carbon-coated positive electrode active material.

The surface of the carbon-coated positive electrode active material having not yet been heated for 2 hours at 150° C. was measured by nuclear magnetic resonance spectroscopy (NMR spectroscopy). As a result, a peak (3.95 ppm) corresponding to a methylene group of "benzene ring-$CH_2$—N" of a naphthoxazine ring and a peak (4.92 ppm) corresponding to a methylene group of "O—$CH_2$—N" were detected at almost the same intensity. Therefore, it was confirmed that a resin component containing a naphthoxazine ring was precipitated on the surface of the positive electrode active material.

The measurement by nuclear magnetic resonance spectroscopy was performed using $^1$H-NMR (600 MHz) manufactured by Varian Inova. At the time of the measurement, deuterated dimethyl sulfoxide was used, spectra were integrated 256 times, and a mitigation time was set to be 10 seconds.

The obtained carbon-coated positive electrode active material was analyzed by Raman spectroscopy by using Almega XR (manufactured by Thermo Fisher Scientific Inc.). As a result, a peak was observed in both of a G band and a D band, and this leaded to a conclusion that the naphthoxazine resin turned into amorphous carbon.

A ratio of a peak intensity of the G band to a peak intensity of the D band was 1.2, and a 530 nm-laser beam was used.

Figure 1:
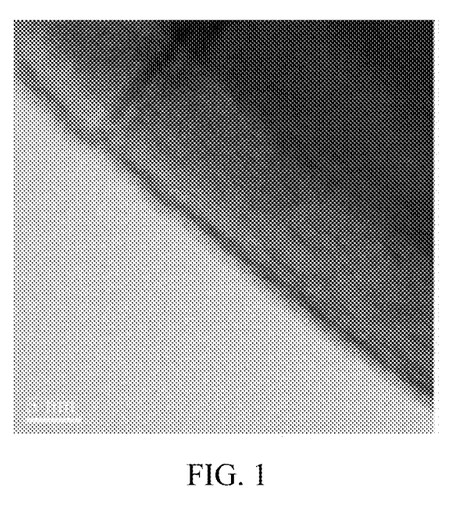
FIG. 1 is a sectional image (electron micrograph) of a carbon-coated positive electrode active material obtained in Example 1.

FIG. 1 is a sectional image (electron micrograph) of the obtained carbon-coated positive electrode active material. A thickness thereof was measured using the following method, and as a result, it was confirmed that an amorphous carbon coating layer having a thickness of 12 nm was formed.

EXAMPLE 2

0.3 g of 1,5-dihydroxynaphthalene (manufactured by TOKYO CHEMICAL INDUSTRY CO., LTD.), 0.15 g of 40% methylamine (Wako Pure Chemical Industries, Ltd.), and 0.3 g of a 37% aqueous formaldehyde solution (manufactured by Wako Pure Chemical Industries, Ltd.) were sequentially dissolved in ethanol, thereby preparing 20 g of a mixed ethanol solution.

Figure 2:
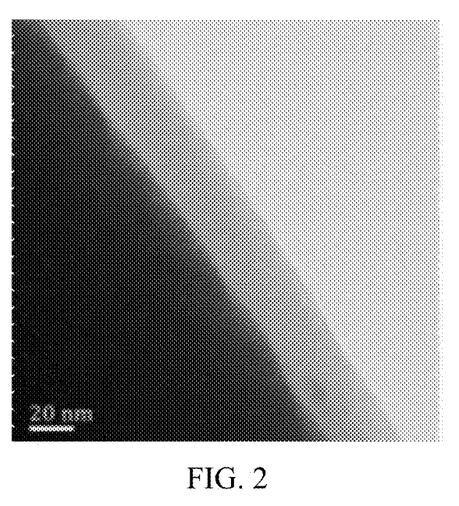
FIG. 2 is a sectional image (electron micrograph) of a carbon-coated positive electrode active material obtained in Example 2.

Then, 0.5 g of positive electrode active material particles (lithium cobalt oxide "$LiCoO_2$", average particle size: 2 μm) were added to the obtained mixed solution, and the solution was treated for 2 hours in an ultrasonic tank. The solution was filtered, washed 3 times with ethanol, and dried for 3 hours at 50° C. in a vacuum. Furthermore, the particles dried as above were heated for 2 hours at 250° C., thereby obtaining carbon-coated positive electrode active material. FIG. 2 shows a sectional image (electron micrograph) of the obtained carbon-coated positive electrode active material. A thickness thereof was measured using the following method, and as a result, it was confirmed that an amorphous carbon coating layer having a thickness of 30 nm was formed.

EXAMPLE 3

0.8 g of 1,5-dihydroxynaphthalene (manufactured by TOKYO CHEMICAL INDUSTRY CO., LTD.), 0.35 g of 40% methylamine (Wako Pure Chemical Industries, Ltd.), and 0.7 g of a 37% aqueous formaldehyde solution (manufactured by Wako Pure Chemical Industries, Ltd.) were sequentially dissolved in ethanol, thereby preparing 20 g of a mixed ethanol solution.

Then, 0.5 g of positive electrode active material particles (lithium cobalt oxide "LiCoO$_2$", average particle size: 2 μm) were added to the obtained mixed solution, and the solution was treated for 1 hour in an ultrasonic tank. The solution was filtered, washed 3 times with ethanol, and dried for 3 hours at 50° C. in a vacuum. Furthermore, the particles dried as above were heated for 2 hours at 250° C., thereby obtaining carbon-coated positive electrode active material. From a sectional image of the obtained carbon-coated positive electrode active material, a thickness of the material was measured using the following method. As a result, it was confirmed that an amorphous carbon coating layer having a thickness of 50 nm was formed.

COMPARATIVE EXAMPLE 1

The "positive electrode active material particles (lithium cobalt oxide)" used in Example 1 were used as they were without being treated in "(Formation of coating layer)".

COMPARATIVE EXAMPLE 2

1.5 g of 1,5-dihydroxynaphthalene (manufactured by TOKYO CHEMICAL INDUSTRY CO., LTD.), 0.4 g of 40% methylamine (manufactured by Wako Pure Chemical Industries, Ltd.), and 0.8 g of a 37% aqueous formaldehyde solution (manufactured by Wako Pure Chemical Industries, Ltd.) were sequentially dissolved in ethanol, thereby preparing 20 g of a mixed ethanol solution.

Then, 3.0 g of positive electrode active material particles (lithium cobalt oxide "LiCoO$_2$", average particle size: 2 μm) were added to the obtained mixture, and the solution was treated for 2 hours in an ultrasonic tank. The solution was filtered, washed 3 times with ethanol, and dried for 3 hours at 50° C. in a vacuum. The particles dried as above were heated for 5 hours at 200° C., thereby obtaining carbon-coated positive electrode active material.

COMPARATIVE EXAMPLE 3

1.0 g of positive electrode active material particles (lithium cobalt oxide "LiCoO$_2$", average particle size: 2 μm) were added to 50 ml of water in which 1.5 g of glucose was dissolved, and the solution was stirred to disperse the particles. Then, the dispersion was moved to a pressure-resistant container made of stainless steel including a Teflon (registered trademark) inner cylinder in the inside thereof and subjected to a thermal treatment for 8 hours at 180° C. After the reaction, the mixed solution was cooled to room temperature and went through a step of centrifugation and washing, thereby obtaining carbon-coated positive electrode active material.

(Evaluation method)

(1) Measurement of film thickness of coating layer (average film thickness and CV value)

An average film thickness and a CV value of the coating layer were evaluated using a transmission microscope (FE-TEM).

Specifically, for 20 random particles, sectional images of coating layers were captured using FE-TEM. Then, from the obtained sectional images, a film thickness was randomly measured at 10 different sites of each particle, and an average film thickness and a standard deviation were calculated. From the obtained numerical values, a coefficient of variation of the film thickness was calculated.

There is a big difference in an atomic weight between carbon, with which the particle surface is coated, and the lithium cobalt oxide of the core. Therefore, from a contrast difference of the TEM image, a film thickness of the coating layer (carbon layer) can be estimated.

(2) TOF-SIMS measurement

For the coating layer of the obtained particles, by using a TOF-SIMS 5-type device (manufactured by ION-TOF GmbH), a mass spectrum (at around 77.12) resulting from a benzene ring and a mass spectrum (at around 127.27) resulting from a naphthalene ring were confirmed by Time-of-Flight Secondary Ion Mass Spectrometry (TOF-SIMS). The TOF-SIMS measurement was performed under the following conditions. Furthermore, in order to avoid contamination resulting from contaminants in the air or from the storage case as much as possible, the prepared sample was stored in a clean case for storing a silicon wafer.

Primary ion: 209Bi+1
Ion voltage: 25 kV
Ion current: 1 pA
Mass range: 1 to 300 mass
Analysis area: 500×500 μm
Prevention of charging: neutralization by electron irradiation
Random raster scan (3) X-ray diffraction By using an X-ray diffractometer (SmartLab Multipurpose, manufactured by Rigaku Corporation), diffraction data was obtained under the following measurement conditions. X-ray wavelength: Cukα 1.54 A, measurement range: 2θ=10° to 70°, scan rate: 4°/min, step: 0.02°

Regarding the obtained diffraction data, whether or not a peak is detected at a position of 2θ=26.4° was confirmed.

Furthermore, from the obtained diffraction data, a half-width was calculated and plugged into the Scherrer equation, thereby determining a crystallite size. Specifically, an average crystallite diameter calculated from a half-width at the time when 2θ=27.86° was adopted. Furthermore, an average crystallite diameter obtained after the particles were fired for 2 hours at 800° C. was also measured.

A series of analyses described above was performed using analysis software (PDXL 2).

(4) Metal ion elution amount 50 mg of the particles obtained in examples and comparative examples were put into 30 ml of a non-aqueous electrolytic solution (electrolyte: LiPF$_6$, solvent: mixture of ethylene carbonate and dimethyl carbonate (40:60)). The solution was sealed and stored for 20 hours in an oven at 60° C. Then, the sample solution was filtered through a membrane filter, and a concentration of metal ions in the obtained solution was measured by inductively coupled plasma (ICP) spectroscopy.

The metal ion elution amount in Table 1 is a relative quantity obtained when the elution amount of Comparative Example 1 is regarded as being 1.

(5) Charging/discharging characteristics (Preparation of slurry for forming electrode)

The obtained positive electrode active material, Ketjen black conductive particles as a conduction aid, and polyvinylidene fluoride (PVdF) as a binder were mixed together at a mass ratio of 90:5:5. As a dispersion medium n-methylpyrrolidone (NMP) was added to the mixture and the mixture was treated with a paint shaker, thereby preparing a slurry paste.

(Preparation of positive electrode)

An aluminum plate was used as a current collector, and both surfaces of the aluminum plate was uniformly coated with the obtained slurry paste. Then, in a state where the aluminum plate was being pressed, the slurry paste was dried at 150° C. under reduced pressure, and the aluminum plate was cut in 20 mm×20 mm, thereby obtaining a positive electrode.

(Preparation of lithium ion battery)

A metal lithium plate cut in 30 mm×30 mm was used as a negative electrode, and the positive electrode and the negative electrode were caused to face each other across a separator composed of a polyolefin-based porous membrane. The resultant was inserted into an exterior body as an aluminum laminate. From the end of the laminate as the exterior body, an electrolytic solution (1 M $LiPF_4$/EC:DEC=1:1 mixed solvent) was injected, thereby preparing a single stack cell of a lithium ion battery.

By using the obtained single stack cell, a charging/discharging cycle test was performed. The battery was charged by a constant current-constant voltage (CC-CV) charge method at 0.1 C and 4.2 V, and discharged by a constant current (CC) discharge method at 0.1 C.

A capacity retention rate shown in Table 1 that was obtained after charging and discharging were performed 50 times was calculated by the following equation.

Capacity retention rate (%)=value of discharge capacity after charging and discharging are repeated 50 times/initial discharge capacity×100

According to one or more embodiments of the present invention, it is possible to provide a positive electrode active material for a lithium ion battery that can suppress elution of metal ions or a change in a crystal structure at the time of charging and discharging, hardly deteriorates over time at the time of use, and can achieve high stability at the time of charging and discharging.

Furthermore, according to one or more embodiments of the present invention, it is possible to provide a method for manufacturing the positive electrode active material of a lithium ion battery and a lithium ion battery.

Although embodiments of the disclosure have been described using specific terms, devices, and methods, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. Therefore, the spirit and scope of the appended claims should not be limited to the description of the preferred versions contained therein.

The invention claimed is:

1. A positive electrode active material for a lithium ion battery, comprising:
   a coating layer on a surface of a positive electrode active material, the coating layer comprising amorphous carbon and nitrogen derived from an oxazine resin, wherein
   a ratio of a peak intensity of a G band to a peak intensity of a D band is 1.0 or greater when the amorphous carbon is measured by Raman spectroscopy,
   an average film thickness of the coating layer is 100 nm or less,
   a coefficient of variation (CV value) of a film thickness of the coating layer is 10% or less,
   no peak is detected at a position in which 2θ equals 26.4° when the coating layer is measured by X-ray diffractometry, and
   a mass spectrum resulting from a benzene ring and a mass spectrum resulting from a naphthalene ring are detected when the coating layer is measured by time-of-flight secondary ion mass spectrometry (TOF-SIMS).

2. The positive electrode active material for a lithium ion battery according to claim 1, wherein the oxazine resin is a naphthoxazine resin.

3. The positive electrode active material for a lithium ion battery according to claim 1, wherein the positive electrode active material is an oxide of a transition metal containing lithium.

4. The positive electrode active material for a lithium ion battery according to claim 2, wherein the positive electrode active material is an oxide of a transition metal containing lithium.

TABLE 1

| | Positive electrode active material | | Coating layer | | | | | | Evaluation of physical properties | |
|---|---|---|---|---|---|---|---|---|---|---|
| | | | | Average film thickness (nm) | CV value of film thickness (%) | Ratio of peak intensity | TOF-SIMS measurement | | | Flution amount of metal ions | Capacity retention rate (%) |
| | Material | Shape | Material | | | | Benzene ring | Naphthalene ring | X-ray diffraction | | |
| Example 1 | $LiCoO_2$ | Particle shape | Amorphous carbon | 12 | 4 | 1.2 | Present | Present | No peak | 0.7 | 92 |
| Example 2 | $LiCoO_2$ | Particle shape | Amorphous carbon | 30 | 5 | 1.7 | Present | Present | No peak | 0.55 | 95 |
| Example 3 | $LiCoO_2$ | Particle shape | Amorphous carbon | 50 | 8 | 2.5 | Present | Present | No peak | 0.4 | 96 |
| Comparative Example 1 | $LiCoO_2$ | Particle shape | — | — | — | — | — | — | Absent | No peak | 1 | 75 |
| Comparative Example 2 | $LiCoO_2$ | Particle shape | Amorphous carbon | 150 | 20 | 1.5 | Present | Present | No peak | 0.9 | 82 |
| Comparative Example 3 | $LiCoO_2$ | Particle shape | Amorphous carbon | 120 | 15 | 0.7 | Absent | Absent | No peak | 0.85 | 80 |

5. The positive electrode active material for a lithium ion battery according to claim 3, wherein the positive electrode active material is at least one selected from the group consisting of $LiCoO_2$, $LiNiO_2$, $LiMn_2O_4$, $LiMnCoO_4$, $LiCoPO_4$, $LiMnCrO_4$, $LiNiVO_4$, $LiMn_{1.5}Ni_{0.5}O_4$, $LiCoVO_4$, and $LiFePO_4$.

6. The positive electrode active material for a lithium ion battery according to claim 1, wherein the positive electrode active material has a particle shape.

* * * * *